Oct. 19, 1926.
H. S. DILLS
ARTIFICIAL BAIT
Filed May 20, 1925
1,604,027
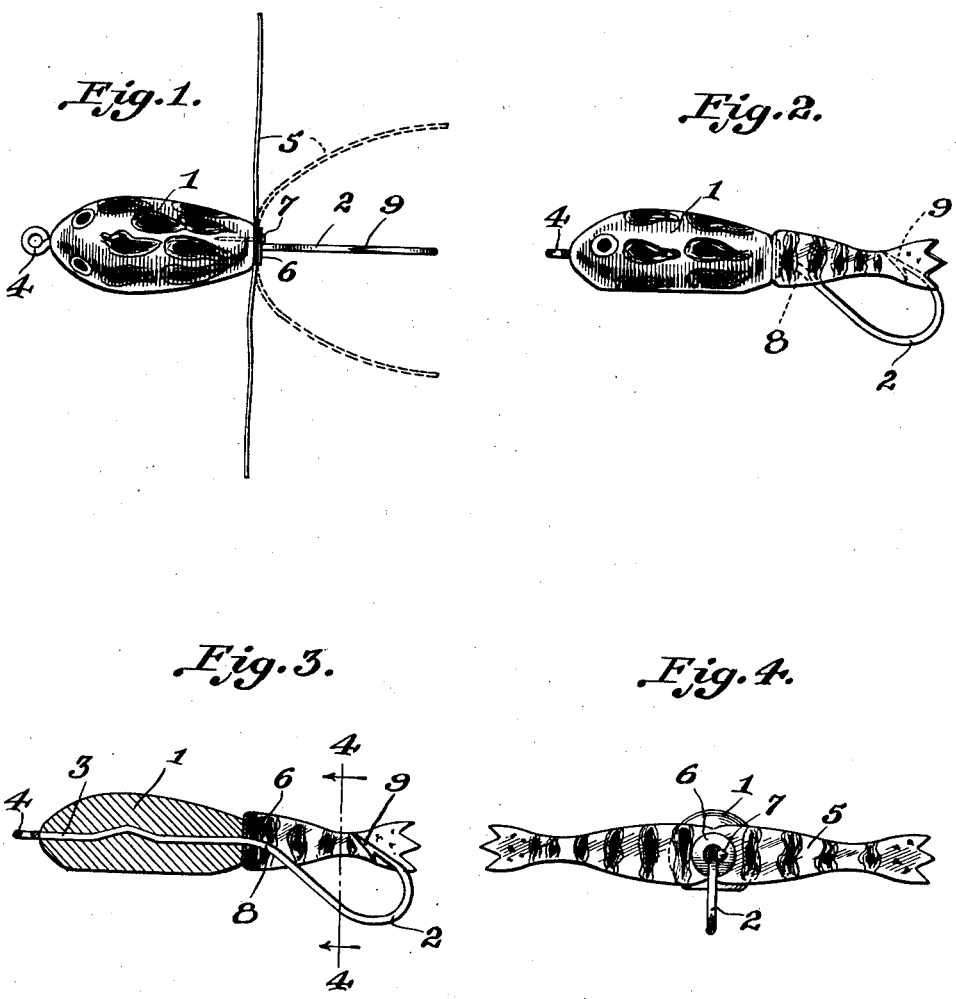
Inventor
H. S. Dills
By Eccleston & Eccleston.
Attorneys Patented Oct. 19, 1926.

1,604,027

UNITED STATES PATENT OFFICE.

HENRY S. DILLS, OF GARRETT, INDIANA, ASSIGNOR TO THE CREEK CHUB BAIT CO., OF GARRETT, INDIANA, A CORPORATION OF INDIANA.

ARTIFICIAL BAIT.

Application filed May 20, 1925. Serial No. 31,571.

This invention relates to artificial bait for fishing purposes and has for its object to provide such a bait or lure which, when in use, will simulate natural or live bait.

In the present embodiment of the invention the lure is designed to represent a frog the legs of which are constructed of resilient material which, when the bait is drawn through the water, will flex rearwardly in simulation of the natural movements of a frog.

A further object of the invention resides in so positioning the hook with respect to the frog that the former will act substantially after the manner of a keel or ballast for maintaining the lure in upright position; and also in so locating the hook that it will be partly enveloped by the flexible legs of the frog when being drawn through the water so as to protect the hook against entanglement with weeds and the like.

Another object of the invention consists in a novel and inexpensive means by which the flexible material forming the legs of the lure may be attached to the body thereof.

Other objects and advantages of the invention will be apparent from the following description when taken in connection with the accompanying drawings in which:

Figure 1 is a plan view of the lure showing in dotted lines one of the positions assumed by the resilient legs.

Figure 2 is a side elevation of the lure.

Figure 3 is a vertical sectional view thereof; and

Figure 4 is a sectional view taken on line 4—4 of Fig. 3, the legs being shown as extended transversely.

As hereinbefore stated one of the important objects of the present invention is the provision of an artificial bait or lure which will give a life-like simulation of a swimming frog or the like. Accordingly the body 1 of the embodiment of the invention shown on the accompanying drawings is designed to represent the body of a frog and is made of any desirable and appropriate material.

The body 1 is molded or otherwise rigidly connected to the fish hook 2 as shown in Figure 3 by having the shank 3 of the hook extended longitudinally thereof with the eye 4 positioned just beyond the front end of the frog, and to which a fishing line is adapted to be attached. In order that the lure may simulate the actions of a frog while swimming, a strip of rubber or the like 5 is attached to the rear end of the body portion and extends transversely thereof as clearly shown on the drawing. This strip 5 is suitably decorated and shaped to represent the legs of a frog and is secured to the rear end of the body portion 1 by means of a washer 6 which surrounds the shank 3 of the fish hook and which is permanently attached to the body portion 1 by means of a pin or the like 7. Although I have shown the two legs of the frog as formed of a single strip 5, it will be understood that a separate strip may be used for each leg, if found desirable. Also the specific manner of attaching the legs to the body, and attaching the hook to the body, may be changed in numerous respects.

As the lure thus far described is drawn through the water it will be apparent that the rubber strip or strips 5 representing the legs of the frog will flex backwardly to a greater or less degree depending on the speed with which the lure is drawn through the water. Furthermore, as the speed of travel of the lure through the water is varied the legs will be caused to flex to varying degrees thereby reproducing the action of the legs of a live frog in swimming.

An important function of the resilient legs 5 in addition to simulating the movements of a swimming frog is that these legs when flexed backwardly will overlap the point of the fish hook, as clearly shown in Figures 2 and 3 thereby guarding the hook against entanglement by weeds and the like when in use. In order that the legs 5 may accomplish this latter function and also in order that the hook may function somewhat after the manner of a keel or ballast to hold the body of the frog in upright position, the hook portion of the fish hook is bent downwardly at the point 8 so as to lower the center of gravity of the lure. This bending of the hook at the point 8 also brings the point 9 of the hook in alignment with the main body portion of the lure, as clearly shown in Figures 2 and 3.

Obviously, therefore, as the bait is drawn through the water and the legs 5 are caused to flex rearwardly they will assume such position with relation to the point of the hook as to direct weeds to either side thereof and thus avoid their entanglement with the point of the hook.

From the foregoing description taken in connection with the accompanying drawings it will be seen that I have designed a very inexpensive construction consisting of three elements, namely, the body, the resilient legs and the hook, but which are so constructed and combined as to present a lifelike appearance when the lure is in use, as well as to effectively protect the hook from weeds and the like.

In accordance with the patent statutes I have described what I now believe to be the best embodiment of the invention, it being understood that while the drawing shows a practical form of the invention, the invention is by no means confined to strict conformity therewith, but may be changed or modified so long as such changes or modifications mark no material departure from the salient features of the invention as pointed out in the appended claims.

Having fully described my invention what I claim as new and desire to secure by Letters Patent is:

1. In an artificial bait or lure, a body portion, a strip of resilient material mounted on the rear end of said body portion and extending transversely thereof, a hook fixedly secured to said body portion and having the shank thereof extending through said resilient strip, and means for securing said strip to the body portion.

2. In an artificial bait or lure, a body portion simulating the body of a frog, a hook extending rearwardly therefrom, an element formed of a strip of flexible material, means attaching said strip of flexible material to the rear end of the body portion with the ends of the strip extending a substantial distance beyond the said body portion, whereby when the lure is drawn through the water the strip of flexible material will flex rearwardly in simulation of a swimming frog and will reach rearwardly a sufficient distance to partly encircle the point of said hook to protect the same.

3. In an artificial bait or lure, a body portion, a hook rigidly connected to said body portion and extending rearwardly therefrom, the curve of the shank of the hook extending downwardly with the point of the hook substantially in alignment with the body of the lure, and a flexible element forming a part of the lure and extending substantially transversely thereof, said flexible element adapted to be flexed into a hook-protecting position as the line is drawn through the water.

4. In an artificial bait or lure, a body portion, a leg of resilient material, and means for fixedly securing said leg to the body portion, said means comprising a washer for engaging said resilient material and a pin or the like for securing said washer in place.

5. In an artificial bait or lure, a body portion, a strip of resilient material mounted at the rear of said body portion and extending transversely thereof, a hook fixedly secured to said body portion and having the shank thereof extending through said resilient strip, a washer surrounding the shank of said hook and in engagement with said resilient strip, and means for securing said washer and strip in place.

HENRY S. DILLS.